Patented Feb. 6, 1940

UNITED STATES PATENT OFFICE 2,189,411

ANTIOXIDANT

Robert V. Yohe, Cuyahoga Falls, Ohio, assignor to The B. F. Goodrich Company, New York, N. Y., a corporation of New York No Drawing. Application October 14, 1937, Serial No. 168,976

18 Claims. (Cl. 260—808)

This invention relates particularly to the art of rubber manufacture and especially to the preservation of rubber and rubber goods against deterioration, but includes also the preservation of other organic materials which tend to deteriorate by absorption of oxygen from the air such as fatty oils, cracked gasoline and other petroleum products, soaps, synthetic plastics, essential oils, and the like.

It is well known that many organic substances undergo a more or less rapid deterioration which is commonly ascribed to the action of atmospheric oxygen. It has heretofore been proposed to retard or inhibit this deterioration by adding a small proportion of a phenol, an aromatic base, or some other like substance, termed generally an "antioxidant".

I have discovered a new class of antioxidants which are extraordinarily effective in retarding the deterioration of rubber and like organic materials. The compounds which belong to this class may be designated generally as substituted diarylamines which contain at least one alkenyl group linked to a nuclear carbon atom by oxygen or sulfur. The diarylamines of this invention are all secondary amines which contain an amino nitrogen attached by single bonds to nuclear carbon atoms of two aromatic groups. The para substituted compounds are generally more active than either ortho or meta, and ortho more active than meta. The preferred substituents are alpha-beta alkenyl groups, by which I mean groups containing the double bond and the free valence on the same carbon, though groups with the double bond in the beta-gamma, gamma-delta, etc. positions have given satisfactory results.

The class of compounds described above includes, for example, p-propenoxy diphenylamine, p,p'-dipropenoxy diphenylamine, p-allyloxy diphenylamine, p-isopropenoxy-phenyl, o-tolyl amine, 4-isocrotixy di-1-naphthylamine, p-isocrotoxy diphenylamine, p,p'-di-isocrotoxy di-p-xenylamine, p-alpha-beta butenoxy diphenylamine, anilinophenyl isopropenyl sulfide, alpha-naphthylaminophenyl isocrotyl sulfide, and anilinophenyl alpha-beta butenyl sulfide.

As a specific example of one embodiment of my invention, a tire tread composition is prepared by mixing rubber 100 parts by weight, sulfur 5.5 parts, zinc oxide 30 parts, gas black 40 parts, mineral rubber 10 parts, palm oil 5 parts, hexamethylene tetramine 0.75 part and 0.95 part (.5% of the composition) of p-isocrotoxy diphenylamine, whose structural formula is

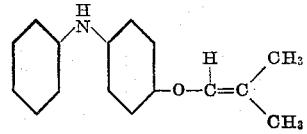

The p-isocrotoxy diphenylamine can be prepared by refluxing isocrotyl chloride and p-hydroxy diphenylamine with alcoholic alkali. The rubber composition containing this compound is vulcanized in a mold for 45 minutes at 294° F. to produce an optimum cure. The vulcanized composition deteriorates only from one-half to one-fourth as rapidly as the same composition without antioxidant, and furthermore it is far more resistant to flex cracking, both before and after artificial aging. Similar results are obtained by substituting as the antioxidant p-isopropenoxy diphenylamine, p-propenoxy diphenylamine, or indeed any member of the class set forth above.

Any of the antioxidants within the scope of this invention may be similarly employed in any type of rubber composition, such as those used for automobile tires and tubes, hose, belting, sheet and thread rubber, rubberized fabrics, molded goods, seamless dipped goods, boots and shoes, etc., whether vulcanized in a mold, in open steam, in hot air, or even vulcanized in the cold by the so-called acid process. The proportion of antioxidant may vary from about 0.1% to 5%, although either smaller or greater proportions may be found useful, and it may be added to the rubber or other substance at any desired state of the preparation of the product. If the material to which it is added is a liquid such as a rubber cement, cracked gasoline, or an oil, the antioxidant may simply be dissolved therein in a suitable small proportion, say 2% by weight. It is accordingly to be understood that the term "treating" is employed in the appended claims in a generic sense to embrace the incorporation of the antioxidant into a solid substance by milling or mastication, its addition to an aqueous dispersion such as rubber latex in a finely dispersed form, its solution in liquids, and any equivalent methods such as applying it to the surface of vulcanized or unvulcanized rubber in the form of a powder, paste, or solution.

The term "rubber" unless otherwise limited is likewise employed in a generic sense to include caoutchouc, balata, gutta-percha, reclaimed rubber, synthetic rubber, artificial rubber isomers, and like products, whether vulcanized or unvulcanized and whether or not admixed with fillers, pigments, vulcanizing and accelerating agents.

While I have herein disclosed certain specific embodiments of my invention, I do not intend to limit myself solely thereto, for many modifications including substituting materials having equivalent chemical properties and varying the proportions of materials used are within the spirit and scope of the invention as defined in the appended claims.

I claim:

1. The method of retarding the deterioration of an organic substance which tends to deteriorate by absorption of oxygen from the air which comprises treating the said substance with a diarylamine containing at least one alkenyl group linked to a nuclear carbon atom by a member of the group consisting of oxygen and sulfur.

2. The method of retarding the deterioration of an organic substance which tends to deteriorate by absorption of oxygen from the air which comprises treating the said substance with a diarylamine containing at least one alpha-beta alkenyl group linked to a nuclear carbon atom by a member of the group consisting of oxygen and sulfur.

3. The method of retarding the deterioration of an organic substance which tends to deteriorate by absorption of oxygen from the air which comprises treating the said substance with an arylphenylamine containing at least one alpha-beta alkenyl group linked to a nuclear carbon atom by oxygen.

4. The method of preserving rubber which comprises treating rubber with a diarylamine containing at least one alkenyl group linked to a nuclear carbon atom by a member of the group consisting of oxygen and sulfur.

5. The method of preserving rubber which comprises treating rubber with a diarylamine containing at least one alpha-beta alkenyl group linked to a nuclear carbon atom by oxygen.

6. The method of preserving rubber which comprises treating rubber with a diarylamine containing at least one isopropenoxy group linked to a nuclear carbon atom.

7. The method of preserving rubber which comprises treating rubber with a diarylamine containing at least one isocrotoxy linked to a nuclear carbon atom.

8. The method of preserving rubber which comprises treating rubber with p-isocrotoxy diphenylamine.

9. The method of preserving rubber which comprises treating rubber with p-isopropenoxy diphenylamine.

10. The method of preserving rubber which comprises treating rubber with p-propenoxy diphenylamine.

11. A composition comprising an organic substance which tends to deteriorate by absorption of oxygen from the air and a small proportion of a diarylamine containing at least one alkenyl group linked to a nuclear carbon atom by a member of the group consisting of oxygen and sulfur.

12. A rubber composition comprising rubber and a small proportion of a diarylamine containing at least one alkenyl group linked to a nuclear carbon atom by a member of the group consisting of oxygen and sulfur.

13. A rubber composition comprising rubber and a small proportion of a diarylamine containing at least one alpha-beta alkenyl group linked to a nuclear carbon atom by oxygen.

14. A rubber composition comprising rubber and a small proportion of p-isocrotoxy diphenylamine.

15. A rubber composition comprising rubber and a small proportion of p-isopropenoxy diphenylamine.

16. A rubber composition comprising rubber and a small proportion of p-propenoxy diphenylamine.

17. A rubber composition which has been vulcanized in the presence of a diarylamine containing at least one alkenyl group linked to a nuclear carbon atom by a member of the group consisting of oxygen and sulfur.

18. The method of retarding the deterioration of an organic substance which tends to deteriorate by absorption of oxygen from the air which comprises treating the said substance with a diarylamine containing at least one alkenyl group linked to a nuclear carbon atom by oxygen.

ROBERT V. YOHE.

CERTIFICATE OF CORRECTION.

Patent No. 2,189,411. February 6, 1940.

ROBERT V. YOHE.

It is hereby certified that error appears in the printed specification of the above numbered patent requiring correction as follows: Page 1, first column, line 13-14, for "retart" read retard; line 41, for "4-isocrotixy" read 4-isocrotoxy; page 2, first column, line 38, claim 7, before the word "linked" insert group; and that the said Letters Patent should be read with this correction therein that the same may conform to the record of the case in the Patent Office.

Signed and sealed this 16th day of April, A. D. 1940.

(Seal)

Leslie Frazer
Acting Commissioner of Patents.